(12) United States Patent
Westendorf et al.

(10) Patent No.: US 6,663,337 B2
(45) Date of Patent: Dec. 16, 2003

(54) BALE LIFT DEVICE, A FRONT END LOADER HAVING A BALE LIFT DEVICE, AND METHOD FOR MOVING BALES

(75) Inventors: Neal W. Westendorf, Dakota Dunes, SD (US); Joseph W. Langenfeld, Onawa, IA (US)

(73) Assignee: Westendorf Manufacturing Co., Inc., Onawa, IA (US)

( * ) Notice: Subject to any disclaimer, the term of this patent is extended or adjusted under 35 U.S.C. 154(b) by 0 days.

(21) Appl. No.: 09/778,673

(22) Filed: Feb. 7, 2001

(65) Prior Publication Data

US 2002/0106272 A1 Aug. 8, 2002

(51) Int. Cl.[7] .................................................. B66F 9/12
(52) U.S. Cl. ........................ 414/685; 414/24.5; 414/911
(58) Field of Search ........................... 414/24.5, 685, 414/661, 911; 294/122, 123, 124

(56) References Cited

U.S. PATENT DOCUMENTS

| | | | |
|---|---|---|---|
| 3,512,665 A | | 5/1970 | Westendorf |
| 4,085,856 A | | 4/1978 | Westendorf |
| 4,787,811 A | | 11/1988 | Langenfeld et al. |
| 4,930,974 A | | 6/1990 | Langenfeld et al. |
| 5,106,253 A | * | 4/1992 | Wedin ........................ 414/24.5 |
| 5,850,975 A | | 12/1998 | Bauer |
| 5,984,606 A | * | 11/1999 | Meeks ........................ 414/24.5 |

OTHER PUBLICATIONS

Brochure, The Loader Specialist, WL Series.
SP–43 Bale Lift Operator's Manueal.
MDS Manufacturing Co., Inc., Attachment Specialists.
ALO Catalogue, "Bale Implements" ALO North America Inc., p. 31, and last page, 2001.

* cited by examiner

Primary Examiner—Donald W. Underwood
(74) Attorney, Agent, or Firm—Merchant & Gould P.C.

(57) ABSTRACT

A bale lift device is provided by the invention. The bale lift device includes a back frame, a spear member, and rotation axis. The back frame includes a first end, a second end, and at least one extension separating the first end from the second end. The back frame includes a first area for attaching to the loader hydraulic cylinder of a front end loader. The back frame includes a second area for attaching to the loader arm of a front end loader. The spear member includes at least one spear having a first end for penetrating a bale and a second end attached to the back frame. The rotation axis allows the spear member to rotate relative to the back frame. A front end loader having a bale lift device and a method for transporting a bale are provided. A method of assisting the removal of a bale lifting device from a bale without additional levers or hydraulic controls or hydraulic cylinders is provided. The method can utilize the controls already existing in the operational functions of the loader.

15 Claims, 11 Drawing Sheets

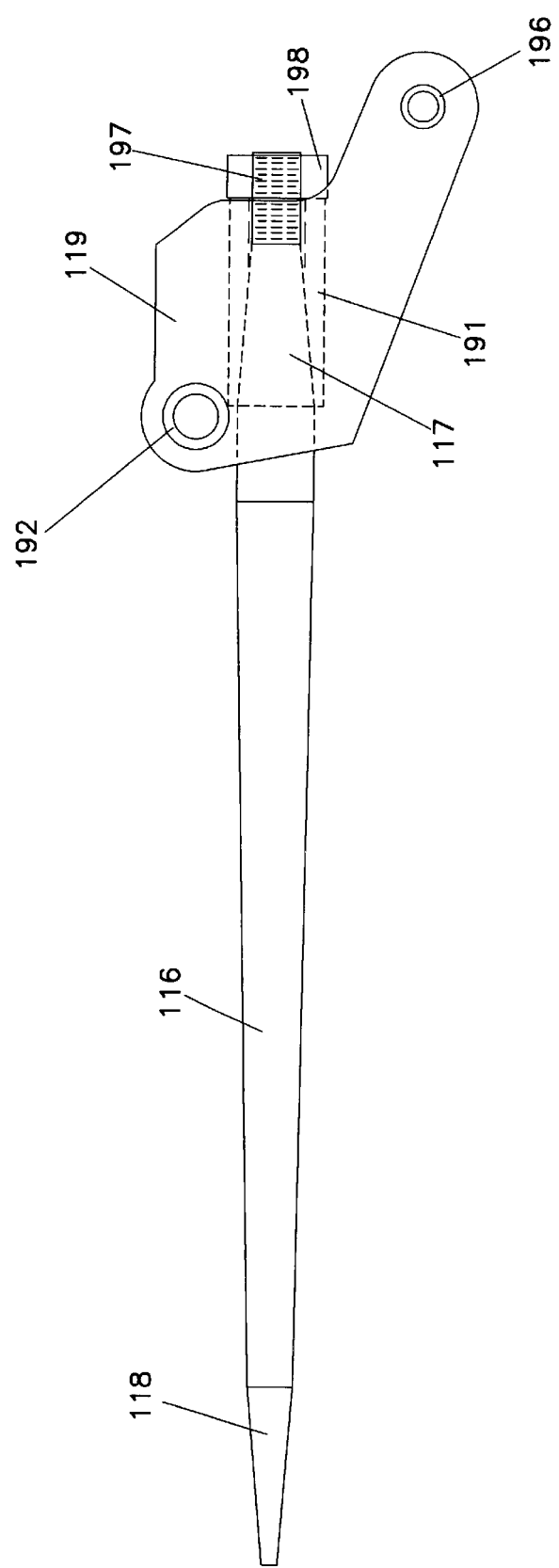

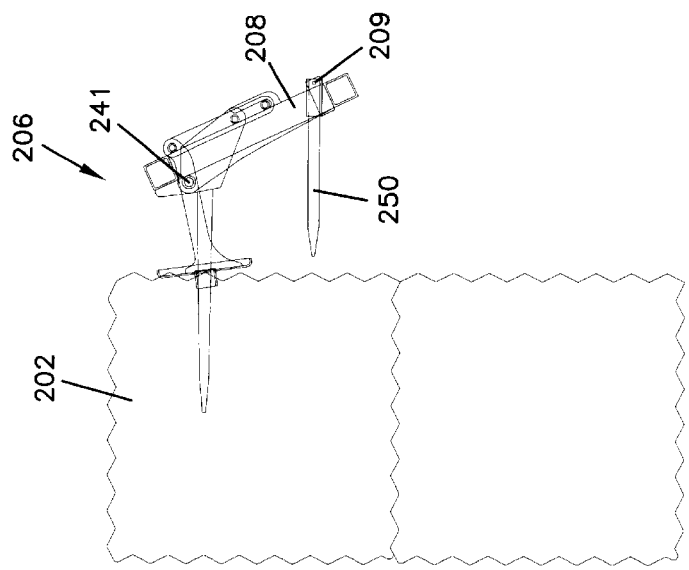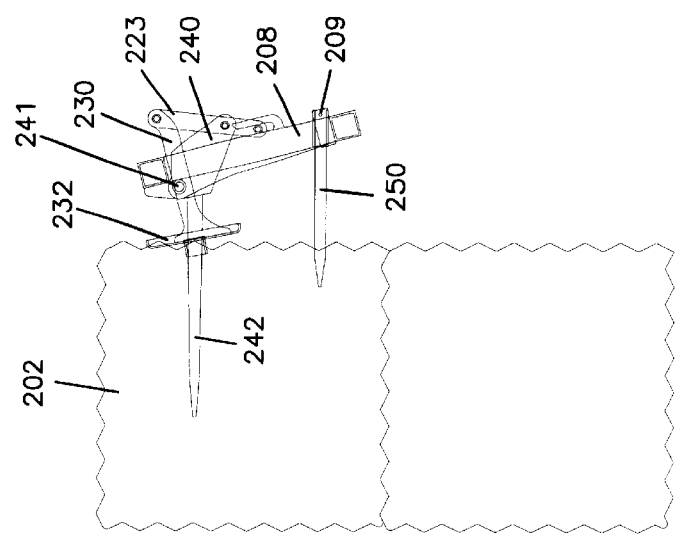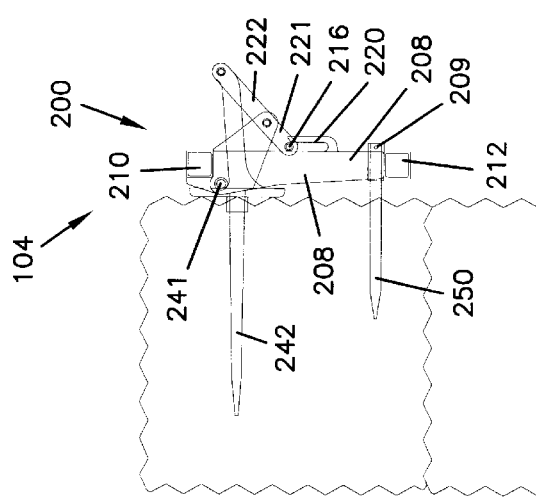

BALE LIFT DEVICE, A FRONT END LOADER HAVING A BALE LIFT DEVICE, AND METHOD FOR MOVING BALES

FIELD OF THE INVENTION

The invention relates to a bale lift device, a front end loader having a bale lift device, and a method for moving bales.

BACKGROUND OF THE INVENTION

Devices are available for moving bales. Exemplary devices that can be used to move bales include any lifting device that has a pivoting bucket including boom loaders and backhoes.

A device specifically designed to move bales is available under the name BS-43 Bale lift from Westendorf Mfg. Co., Inc. This device has three teeth and attaches to a front end loader. No moving parts are provided. Another device for lifting and moving bales is available under the name Square Bale Push from MDS Manufacturing Company of Parkston, S.Dak. This device includes teeth for engaging a bale and a pair of hydraulic cylinders for pushing an arm against the bale for disengaging the teeth from the bale.

SUMMARY OF THE INVENTION

A bale lift device is provided by the invention. The bale lift device includes a back frame, spear member, and rotation axis. The back frame includes a first end, a second end, and at least one extension separating the first end from the second end. The back frame includes a first area for attaching to a loader hydraulic cylinder of a front end loader. The back frame includes a second area for attaching to a loader arm of a front end loader. The spear member includes at least one spear or tooth for engaging and holding a bale and includes a first end for penetrating the bale and a second end attached to the back frame. The rotation axis allows the plurality of teeth to rotate relative to the back frame.

The bale lift device can be provided having a push off constructed to slide along at least a portion of the spear member. The push off is preferably provided adjacent the spear member to help in removal of the spear member from the bale in which it has penetrated.

A method for transporting a bale is provided according to the invention. The method includes a step of engaging a bale with the bale lift device provided according to the invention on a front end loader of a tractor, and moving the bale to a different location. The method additionally includes the step of disengaging the bale lift device from the bale.

An advantage of the present invention is that it provides a bale lift device that relies upon the existing hydraulic cylinder of a front end loader to cause it to disengage from a bale without damaging the bale or causing a stack of bales to fall over as the bale lift device is withdrawn from the bale. Furthermore, the bale lift device is preferably provided without an additional hydraulic cylinder and/or control for operating the bale lift device.

The invention provides a means to allow the existing hydraulic cylinder of a loader to activate beneficial mechanical functions that otherwise are not available without adding an additional hydraulic system. In addition, the bale lift device provides for rotation between the back frame and the spear member about a rotation axis that can be located anywhere to provide rotation between the back frame and the spear member.

BRIEF DESCRIPTION OF THE DRAWINGS

FIG. 10 is an exploded view of the bale lift device of FIG. 7 showing the spear member and the spear elbow.

FIG. 11 is a diagrammatic, side view showing a bale lift device according to the principles of the present invention engaging a bale.

FIG. 12 is a diagrammatic, side view of the bale lift device of FIG. 11 shown partially disengaging from the bale.

FIG. 13 is a diagrammatic, side view of the bale lift device of FIG. 11 shown more fully disengaging from the bale.

DETAILED DESCRIPTION OF THE PREFERRED EMBODIMENT

Figure 1:
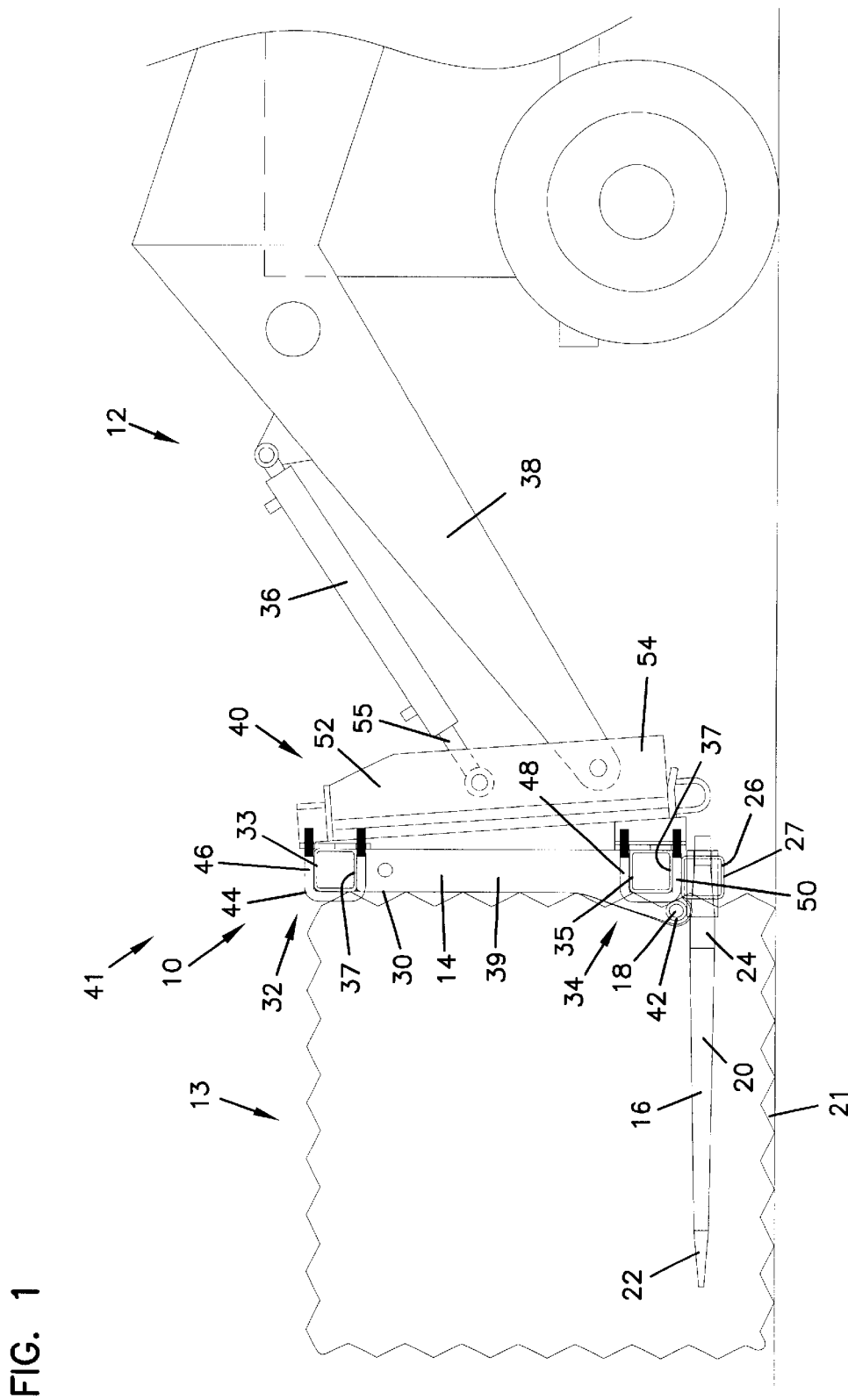
FIG. 1 is a sectional view of a bale lift device according to the principles of the present invention provided on a front end loader and shown engaging a bale.
Figure 2:
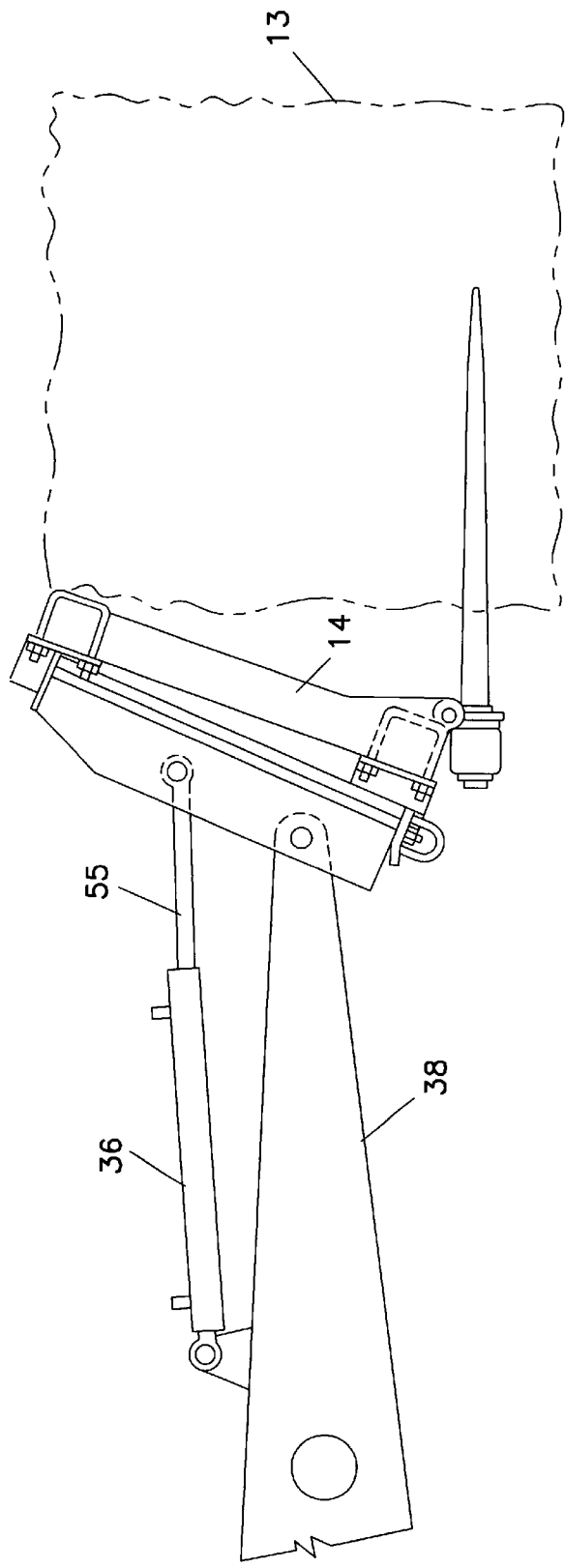
FIG. 2 is a sectional view of the bale lift device of FIG. 1 shown partially disengaging from the bale.
Figure 3:
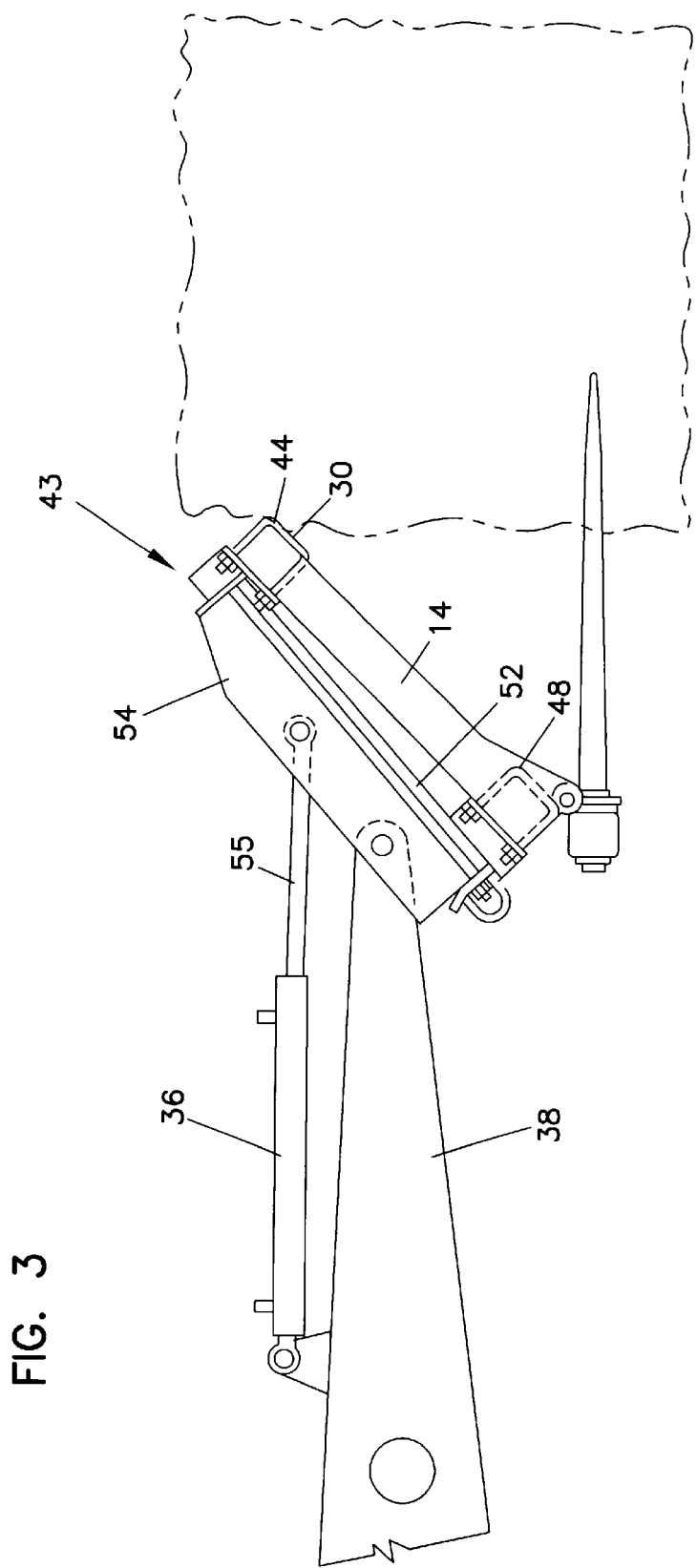
FIG. 3 is a sectional view of the bale lift device of FIG. 1 shown further disengaging from the bale.

Now referring to FIGS. 1–3, a bale lift device according to the invention is shown at reference numeral 10. The bale lift device 10 is shown attached to a front end loader 12 and engaging a bale 13. The bale lift device 10 and the front end loader 12 operate in combination to allow the bale lift device 10 to spear the bale 13, transport the bale 13 to a new location, and then release the bale lift device 10 from the bale 13. The bale can be any type of material provided in the form of a bale such as hay and forage.

The bale lift device 10 includes a back frame 14, a spear member 16, and a rotation axis 18 that allows the back frame 14 to rotate relative to the teeth 16. The spear member 16 is the portion of the bale lift device 10 that engages or penetrates into the bale 13.

The spear member 16 include a plurality of teeth or tines 20 that are constructed for spearing a bale 13 as shown in FIG. 1. It should be understood that the plurality of teeth or tines 20 can be used to lift the bale without spearing the bale. That is, the teeth or tines 20 can be used so that the bale bottom surface 21 rests on top of the teeth or tines 20. The plurality of teeth or tines 20 can be provided having the same length or different lengths. It is generally desirable to provide the plurality of teeth or tines 20 having the same length when used to transport a rectangular bale, and it is generally preferably to provide the plurality of teeth or tines 20 with different lengths when it is desirable to transport round bales. When transporting round bales, it is generally preferable that the center tooth or tine is longer than the end teeth or tines.

The plurality of teeth 20 includes a teeth first end 22 that is preferably provided with a shape that allows the teeth 20 to penetrate a bale. Preferably, the teeth first end 22 is relatively sharp or pointed. The plurality of teeth 20 include a teeth second end 24 attached to a teeth stabilizing member 26. The teeth stabilizing member 26 holds the plurality of teeth 20 together. The teeth stabilizing member 26 can be provided extending across the width of the bale lift device 10. The stabilizing member 26 is preferably provided as a tubular steel member 27. It should be understood that the stabilizing member can be provided as any type of material that provides the desired degree of strength for holding the plurality of teeth or tines 20 together. For example, the stabilizing member can be provided as angle iron, plate, three-sided channel, etc.

The back frame 14 includes a bale engaging surface 30. During the operation of the bale lift device 10, the bale engaging surface 30 generally contacts and pushes against the bale 13. The back frame 14 includes a back frame first end 32 and a back frame second end 34. The back frame first end 32 includes a back frame first end stabilizing member 33, and the back frame second end 34 includes a back frame second end stabilizing member 35. The back frame stabilizing members 33 and 35 are preferably provided as tubular steel members 37. It should be understood that the stabilizing members 33 and 35 can be manufactured from any material that provides the desired level of strength including such materials such as angle iron, plate, three-sided channel, etc. The back frame stabilizing members 33 and 35 are separated from each other by the back frame extensions 39. The back frame extensions 39 hold the back frame stabilizing members 33 and 35 in place and can be provided in any material that provides the desired strength including those materials previously identified.

The bale lift device 10 is operated by the combination of the hydraulic cylinder 36 and the loader arm 38 of the front end loader 12. The back frame 14 is shown attached to a quick attachment device 40 that allows rapid attachment and detachment of the bale lift device 10 to the front end loader 12. Exemplary quick attachment devices that can be used according to the invention are described in U.S. Pat. Nos. 4,085,856 to Westendorf, U.S. Pat. No. 3,512,665 to Westendorf; 4,787,811 to Langenfeld et al., and 4,930,974 to Langenfeld et al. These patents are assigned to Westendorf Mfg. Co., Inc., which is the assignee of the above-identified patent application. These patents are incorporated herein by reference. Although the bale lift device 10 is preferably attached to the front end loader 12 via the quick attachment device 40, it should be understood that the bale lift device 10 can be attached directly to the hydraulic cylinder 36 and the loader arm 38 of the front end loader 12.

The rotation axis 18 is provided to allow rotation between the back frame 14 and the plurality of teeth 20. The back frame second end 34 and the teeth stabilizing member 26 attach to the rotation axis 18 to allow rotation about the rotation axis 18. This allows the spear member 16 and the back frame 14 to rotate relative to each other. The angle of rotation provided between the back frame 14 and the plurality of teeth 20 is preferably between about 10° and about 110° and more preferably between about −5° and about 95°. The bale lift device 10 shown in FIG. 1 is provided in an open position where the angle of rotation between the back frame 14 and the plurality of teeth 20 is about 90°. As shown in FIG. 3, the bale lift device 10 is in a relatively closed position and the angle of rotation between the back frame 14 and the plurality of teeth 20 is about 45°, The rotation axis 18 preferably includes a rod or pivot 42 about which the back frame 14 and the plurality of teeth 20 rotate. As a matter of convenience, the bale lift device 10 can be characterized as being in an open position when it is about to engage a bale, and it can be characterized as being in a closed position when it is disengaging from a bale.

The back frame first end 32 includes a fastener 44 for attaching the back frame first end 32 to the quick attachment device 40. Preferably, the fastener 44 is a U-bolt fastener 46. The back frame second end 34 includes a fastener 48 for attaching the back frame second end 34 to the quick attachment device 40. Preferably, the fastener 48 is a U-bolt fastener 50. Although FIGS. 1–3 show the fasteners 44 and 48 attaching the back frame first end 32 and the back frame second end 34 to the quick attachment device 40, fasteners can instead or in addition be provided for attaching the back frame extensions 39 to the quick attachment device 40. In addition, the fasteners can be provided for attaching the back frame 14 directly to the hydraulic cylinder and the loader arm of a front end loader or any other device provided for operating the bale lift device 10.

The bale lift device 10 is operated by retracting the hydraulic cylinder 36 so that the bale lift device 10 is provided in an open position 41, as shown in FIG. 1. The bale lift device 10 then spears the bale 13 by movement of the front end loader 12 forward. The front end loader 12 can be used to move the bale 13 to a new location. Once the bale 13 is provided in a new location, it is desirable to remove the bale lift 10 from the bale 13 without pulling the bale 13 out of position. In the situation where the bale 13 is placed on top of a stack of bales, it is desirable to disengage the bale lift device 10 from the bale 13 without causing the stack of bales to fall over. In order to disengage the bale lift device 10 from the bale 13, the hydraulic cylinder 36 is extended causing the back frame 14 to rotate relative to the plurality of teeth 20. This causes the bale lift device 10 to close as shown successively in FIGS. 2 and 3. The bale lift 10 is shown in a closed position 43 in FIG. 3. As the hydraulic cylinder 36 extends, the bale engaging surface 30 of the back frame 14 pushes against the bale 13 causing the back frame 14 and the teeth member 16 to rotate about the rotation axis 18 as the plurality of teeth 20 are withdrawn from the bale 13. When the loader 12 backs up at the same rate the hydraulic cylinder 36 extends, the bale 13 remains at its constant position.

The quick attachment device 40 is shown having an attachment portion 52 that attaches to the bale lift device 10, and a front end loader portion 54 that attaches to the front end loader. The attachment portion 52 attaches to the back frame first end 32 by the fastener 44, and to the back frame second end 34 by the fastener 48. The front end loader portion 54 rotatably attaches to the cylinder rod 55 of the hydraulic cylinder 36 and rotatably attaches to the loader arm 38. The attachment portion 52 and the front end loader portion 54 attach together and detach from each other fairly easily. It should be understood that the invention could be practiced without the use of the quick attachment device 40. That is, the cylinder rod 55 can be rotatably attached to the back frame 14 and the loader arm 38 can be rotatably attached to the back frame 14.

Figure 4:
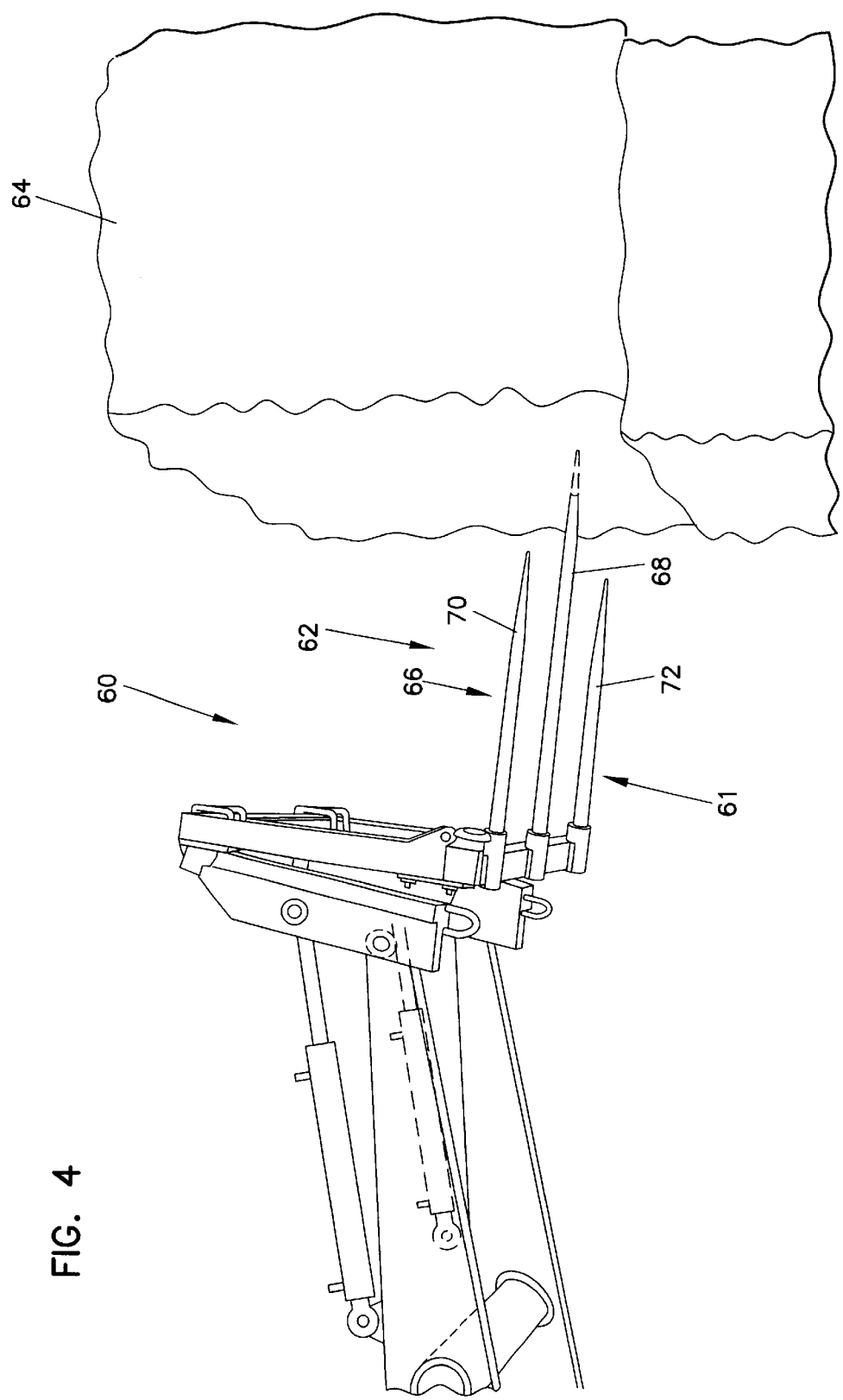
FIG. 4 is a perspective view of a bale lift device according to the principles of the present invention provided on a front end loader and shown in an open position for engaging a bale.

Now referring to FIG. 4, a bale lift device 60 is shown in an open position where the spear member 66 includes a plurality of teeth 62 that are about to engage a bale of hay 64. The plurality of teeth 62 include a 3-tooth arrangement 66 having a center tooth 68 that is longer than the outside teeth 70 and 72. Although this arrangement is shown engaging a rectangular bale 64, it should be understood that this arrangement is particularly useful for round or cylindrical bales.

Figure 5:
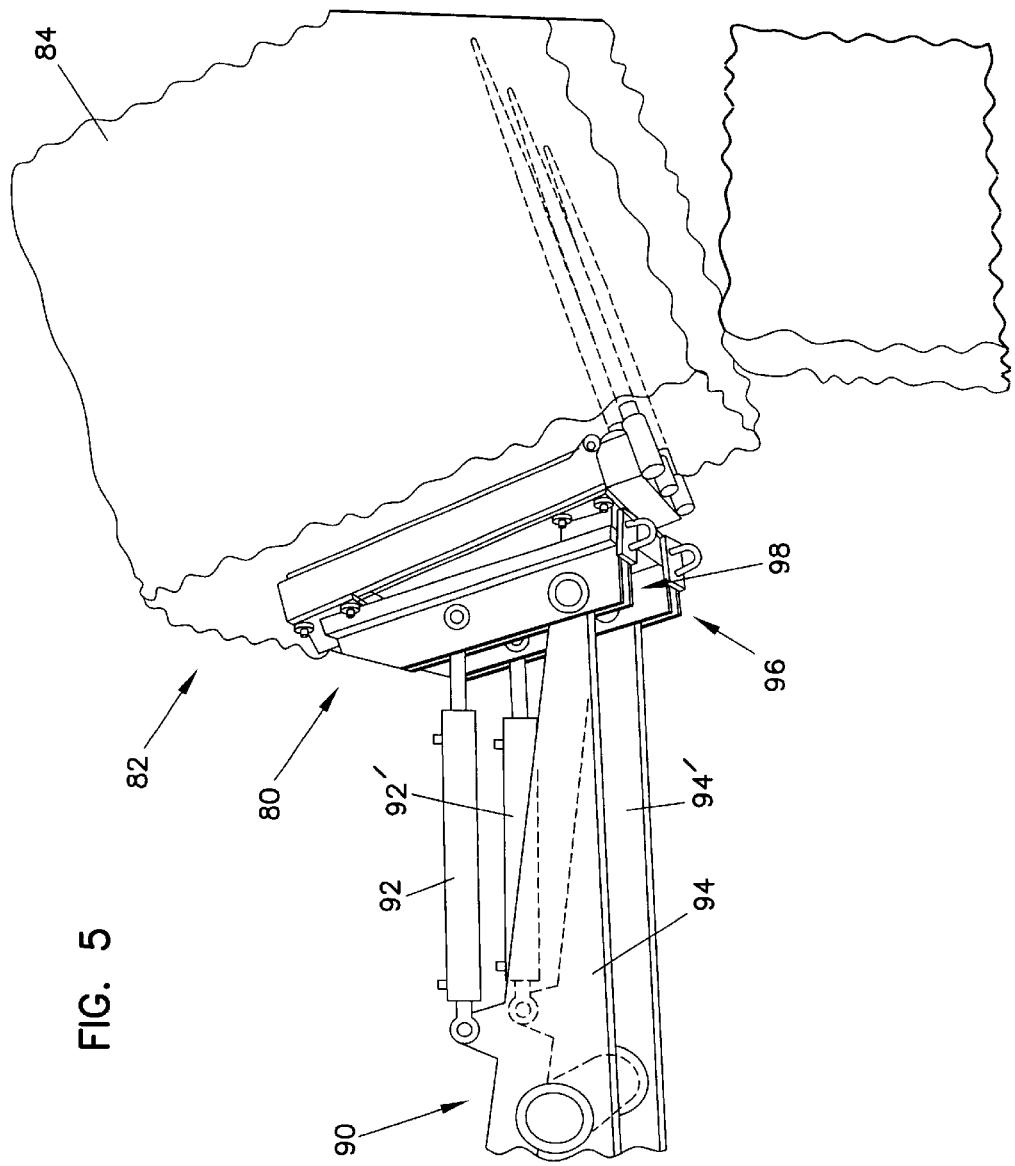
FIG. 5 is a perspective view of a bale lift device according to the principles of the invention provided on a front end loader and shown lifting a bale.
Figure 6:
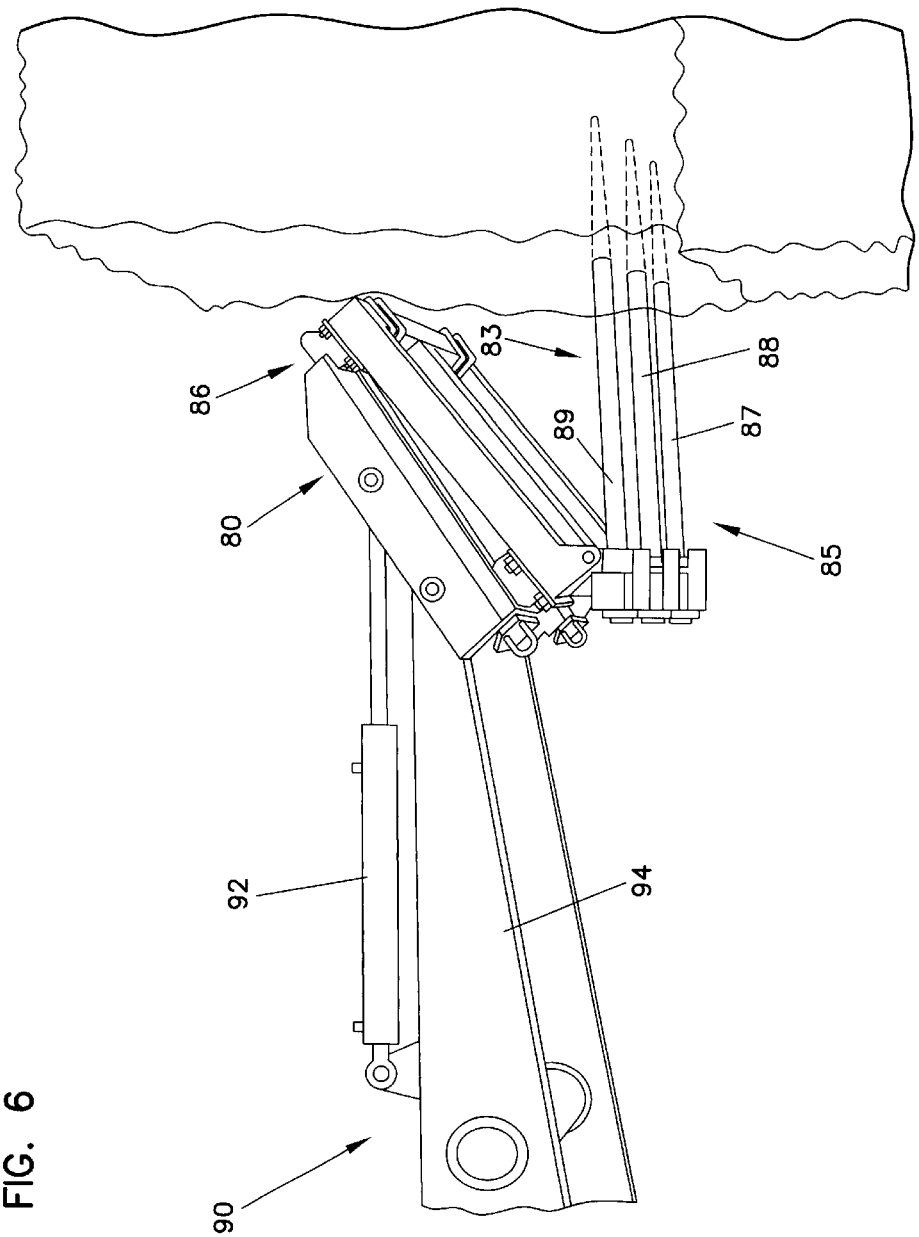
FIG. 6 is a perspective view of the bale lift device of FIG. 5 shown disengaging from the bale.
Figure 7:
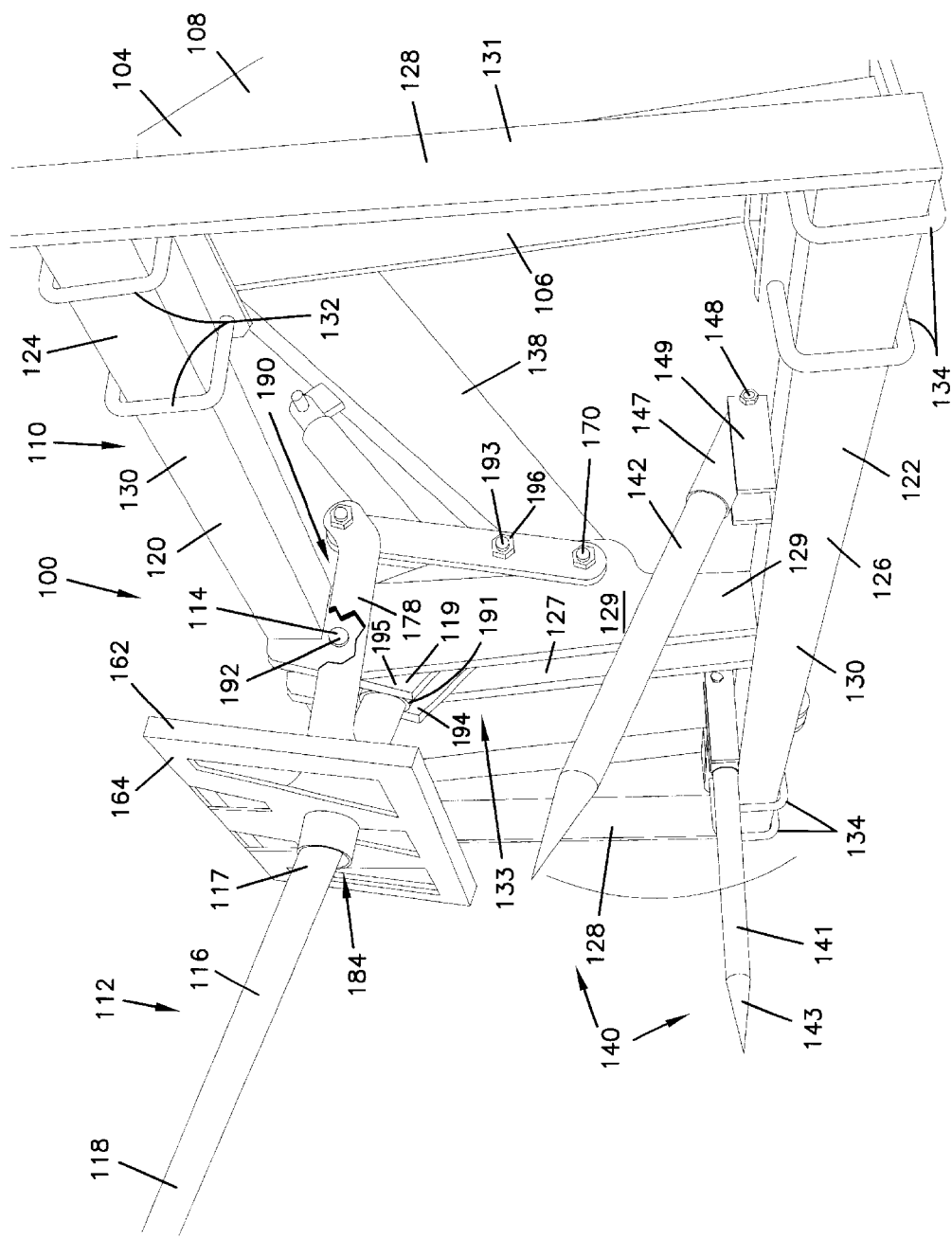
FIG. 7 is a perspective view of an alternative embodiment of a bale lift device according to the principles of the present invention.
Figure 8:
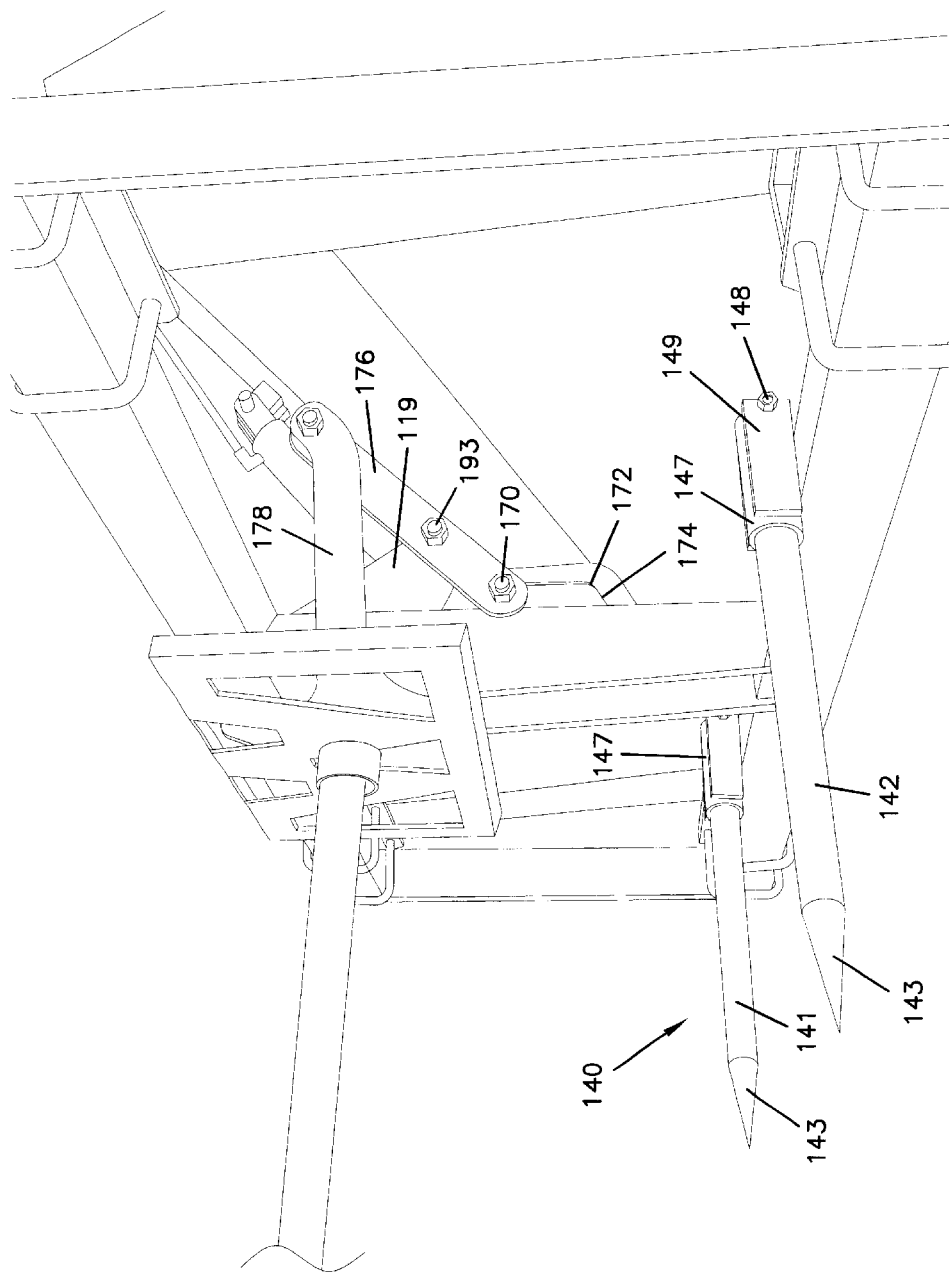
FIG. 8 is a perspective view of the bale lift device of FIG. 7 shown in an open position.
Figure 9:
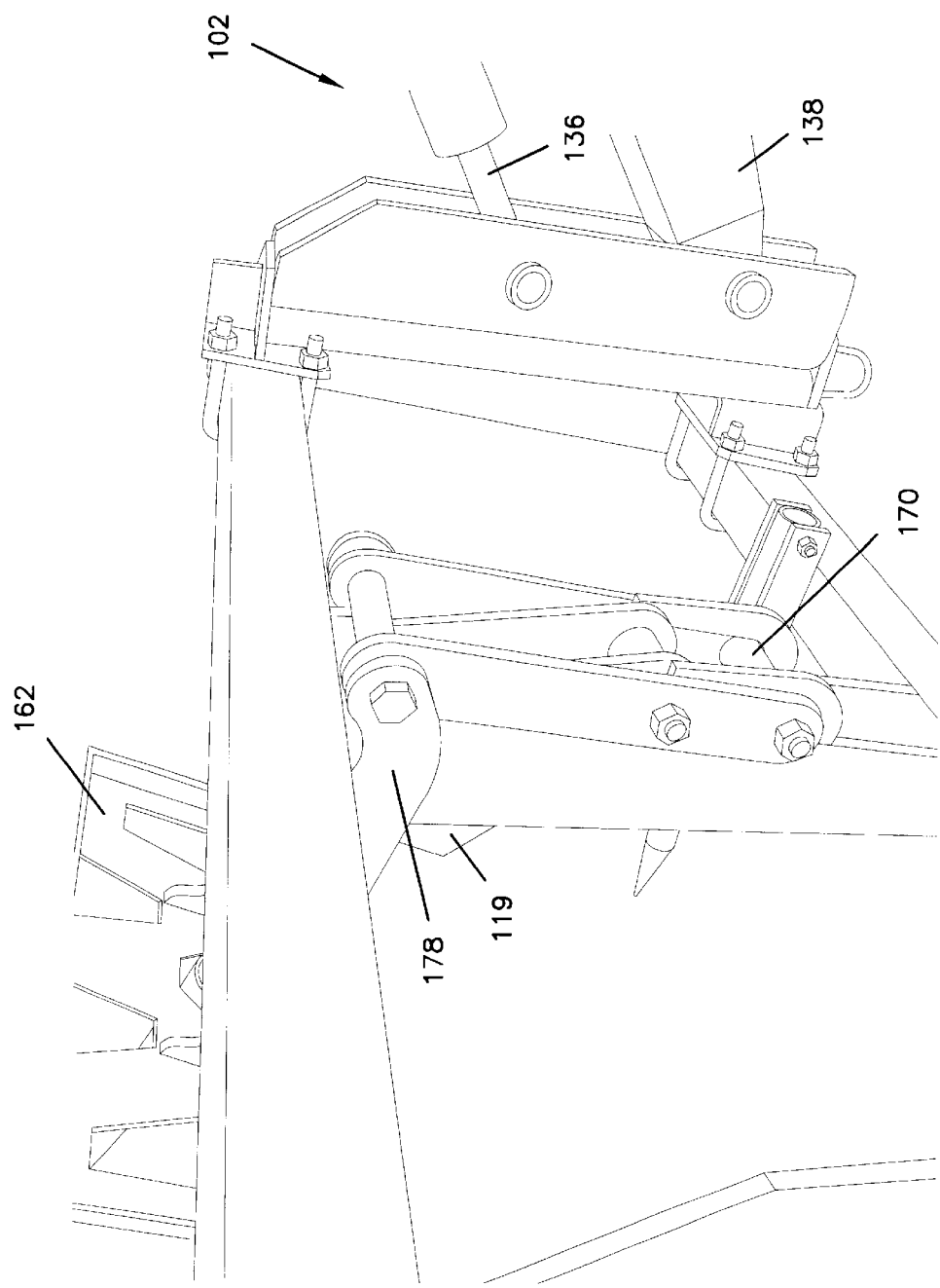
FIG. 9 is a perspective view of the bale lift device of FIG. 7 shown in a closed position.

Now referring to FIGS. 5 and 6, a bale lift device 80 is shown in an open position 82 transporting a bale of hay 84, and in a closed position 86 withdrawing from the bale of hay 84. The spear member 85 includes a plurality of teeth 83 having a left tooth 87, a center tooth 88, and a right tooth 89 having relatively the same length. This type of arrangement is preferred for transporting a rectangular bale. The front end loader 90 includes a hydraulic cylinder 92 and a loader arm 94. Although the description of the front end loader generally refers to "a hydraulic cylinder" and a "loader arm", it should be understood that front end loaders typically have a left hydraulic cylinder 92' and a right hydraulic cylinder 92, and a left loader arm 94' and a right loader arm 94. The left hydraulic cylinder 92' and the left loader arm 94' attach to the bale lift device left side 96, and the right hydraulic cylinder 92 and the right loader arm 94 attach to the bale lift device right side 98. The front end loader 90 can be any front end loader commonly available on the market, but is preferably a front end loader according to U.S. application Ser. No. 09/639,039, filed on Aug. 15, 2000, the entire disclosure of which is incorporated herein by reference.

An advantage of the bale lift device of the invention is that it provides for retraction of the teeth (lifting teeth) from the bale without causing a pull or draw on the bale sufficient to cause the bale to fall. By providing rotation between the back frame and the teeth member of the bale lift device, the teeth can be withdrawn from the bale without the use of additional hydraulic cylinders or control valves or other mechanical linkages. That is, the bale lift device can be operated solely by the operation of a conventional components attached to the bale lift device, such as, the hydraulic cylinder and loader arm found on a conventional front end loader. In addition, it should be appreciated that the bale lift device can be used to lift items that may not be considered bales.

Now referring to FIGS. 7–10, an alternative embodiment of the bale lift device according to the principles of the present invention is indicated at reference numeral 100. The bale lift device 100 is provided attached to a front end loader 102 via a quick attachment device 104. The quick attachment device 104 includes an attachment portion 106 and a front end loader portion 108. The bale lift device 100 includes a back frame 110, a spear member 112, and a rotation axis 114 that allows the back frame 110 to rotate relative to the spear member 112. The spear member 112 includes a spear 116 that engages a bale. The spear 116 includes a first spear end 118 preferably having a relatively pointed tip for engaging and penetrating into a bale. The spear 116 includes a second end 117 that attaches to the rotation axis 114. As shown, the second end 117 attaches to the spear elbow 119 that attaches to the rotation axis 114. The spear 116 and the spear elbow 119 preferably include a three piece assembly that is welded together. The spear elbow 119 preferably includes a first side 194 and a second side 195 that are welded to the sleeve or bushing 191 that is constructed for accepting the second end 117 of the spear 116. In addition, the spear elbow 119 includes a pivot 192 for rotation about the rotation axis 114, and a pivot 193 for rotation about the rotation axis 196 provided along the roller arm 176. As the bale lift device 100 moves between an open position and a closed position, the back frame 110 and the spear member 112 rotate relative to each other about the rotation axis 114.

The second end 117 of the spear 116 preferably includes a threaded portion 197 for threading into a bolt 198 that holds the spear within the sleeve or bushing 191. By providing a threaded attachment, the spear 116 can be conveniently replaced.

The back frame 110 includes a back frame first end 120 and a back frame second end 122. The back frame first end 120 includes a back frame first end stabilizing member 124, and the back frame second end 122 includes a back frame second end stabilizing member 126. The back frame first end stabilizing member 124 and the back frame second end stabilizing member 126 are separated from each other by the back frame extensions 128. The back frame first and second stabilizing members 124 and 126 are preferably provided by tubular steel 130. The back frame extensions are preferably provided by plate steel 131.

The first and second stabilizing members 124 and 126 are preferably additionally held relative to each other by the center tie ribs 127 and 129. The rotation axis 114 is provided extending between the enter tie ribs 127 and 129. In addition, the center tie ribs 127 and 129 provide a channel 133 through which the spear 116 and spear elbow 119 can rotate and remain contained.

The quick attachment device 104 is shown attached to the back frame first end stabilizing member 124 by fasteners 132 and to the back frame second end stabilizing member 126 by the fasteners 134. It should be appreciated that the hydraulic cylinder rod 136 and the loader arm 138 can be attached to the quick attachment device 104 or directly to the back frame 110 without the use of the quick attachment device 104. When the hydraulic cylinder rod 136 and the loader arm 138 are attached directly to the back frame 110, it is preferable that they attach to the first end 120 and the second end 122. It is believed that the hydraulic cylinder rod and the loader arm can attach to the extensions.

The spear 116 can be referred to as a tooth, and the spear member 112 includes the spear 116 and the secondary teeth 140 provided attached to the back frame second and 122. The secondary teeth 140 include a first tooth 141 and a second tooth 142. The secondary teeth 140 include a first end 143 that is sufficiently sharp to engage or penetrate into a bale. The secondary teeth 140 can include sleeves 147 for providing extra tooth support and for secondary teeth 140 to the secondary teeth rotation axis 148. In addition, a brace 149 can be provided for holding the secondary teeth rotation axis 148 to the back frame second end 122. The rotation between the secondary teeth 140 and the back frame 110 is demonstrated in FIG. 7. Preferably, the secondary teeth 140 are available to rotate during the operation of the bale lift device. It is expected that the angle of rotation between the secondary teeth 140 and the back frame 110 will be roughly equivalent to the angle of rotation between the spear 116 and the back frame 110. It is believed that the bale lift device can be provided so that the angle of rotation between the spear member 112 and the back frame 110 can be within the range of about −10° to about 110° and more preferably between about −5° and about 95°.

The bale lift device 100 engages a bale by movement of the bale lift device forward so that the spear 116 and the secondary teeth 140 engage or enter into the bale. The bale lift device 100 can then be used to move the bale to a new location. The bale lift device 100 is disengaged from the bale by rotating the back frame 110 forward. As the back frame 110 rotates forward, the back frame first end 120 moves toward the bale and the back frame second end 122 moves away from the bale. This action causes the push off 162 that includes a bale engaging surface 164 to push against the bale thereby disengaging the spear 116 and the secondary teeth 140 from the bale.

The push off 162 operates by moving toward the bale as the back frame 110 rotates forward. The roller 170 moves down the roller engagement area 172 until it reaches the end 174. The movement of the spear member 112 about the rotation axis 114 causes the roller arm 176 to move the roller 170 down along the roller engagement area 172. This action causes the push off arm 178 to move forward and the bale engaging surface 164 to move toward the first spear end 118 as the containment area 184 moves along the spear member 112. It should be understood that the location of the spear elbow 119 along the roller arm 176 can be adjusted to provide the desired angle of rotation between the spear 116 and the back frame 110. It should be understood that in FIG. 7, a portion of the bale push off arm 178 is removed to show the location of the rotation axis 114.

The operation of a bale lift device 200 in disengaging from a bale 202 is depicted in FIGS. 11–13. The bale lift device 200 is shown in an open position 204 in FIG. 11 and in a closed position 206 in FIG. 13. As the back frame first end 210 rotates forward relative to the back frame second end 212, the roller 216 moves down the roller engagement area 220. The roller 216 is provided at the first end 121 of the roller arm 222. The second end 223 of the roller arm 222 moves forward as the roller 216 moves down the roller engagement area 220. The movement of the second end 223 of the roller arm 222 forward causes the bale push off arm 230 to move forward thereby causing the push off 232 to push against the bale 202. The movement of the back frame 208 in relation to the spear 242 which is inside the bale 202 pivoting about the rotation axis 241 causes the roller arm 222 and roller 216 to move along the back frame 208. This scissor action causes the bale push off arm 230 to move forward along the spear 242.

That causes the push off 232 to push against the bale 202 and removes the spear 242 from the bale 202. As the back frame 208 rotates as shown in FIGS. 12 and 13, the secondary teeth 250 rotate relative to the back frame 208 about the secondary rotation axis 209. When the roller 216 is fully extended into the roller engagement area 220, the push off 232 is at its farthest location away from the back frame 208, the spear 242 is at its minimum angle relative to the back frame 208 and the plurality of teeth 250 are rotated at their minimum angle of rotation about the rotation axis 209 relative to the back frame 208.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A bale lift device comprising:
   (a) a back frame having a first end, a second end, and at least one extension extending between the first end and the second end for separating the first end from the second end, the back frame being constructed for attachment to a loader arm and to a hydraulic cylinder attached to the loader arm;
   (b) a spear member provided for engaging and holding a bale, the spear member having a first end and a second end, the first end being provided for penetrating the bale;
   (c) a rotation axis, wherein the back frame and the spear member are rotatably attached about the rotation axis for providing rotation of the back frame relative to the spear member; and
   (d) the back frame and the spear member are constructed to rotate about the rotation axis as a result of operation of the hydraulic cylinder attached to the loader arm and to the back frame.

2. The bale lift device according to claim 1, wherein the back frame comprises a bale engaging surface.

3. The bale lift device according to claim 1, wherein the spear member comprises a plurality of teeth rotatably attached to the second end of the back frame.

4. The bale lift device according to claim 1, wherein the spear member comprises at least one spear rotatably attached to the back frame at a location provided between the first end and the second end of the back frame.

5. The bale lift device according to claim 1, wherein the spear member comprises a spear and a plurality of secondary teeth, wherein the spear rotates as the back frame rotates.

6. The bale lift device according to claim 1, wherein the rotation axis comprises a pivot.

7. The bale lift device according to claim 1, further comprising a push off attached to the back frame and constructed to move along the spear member toward the spear member first end.

8. A method for transporting a bale, the method comprising steps of:
   engaging a bale with a bale lift device attached to a front end loader of a tractor, wherein the front end loader has left and right loader arms and left and right hydraulic cylinders attached to the left and right loader arms, the bale lift device comprising:
   (a) a back frame having a first end, a second end, and at least one extension extending between the first end and the second end for separating the first end from the second end, the back frame being attached to the left and right loader arms and the left and right hydraulic cylinders;
   (b) a spear member provided for engaging and holding a bale, the spear member having a first end and a second end, the first end being provided for penetrating the bale;
   (c) a rotation axis, wherein the back frame and the spear member are rotatably attached about the rotation axis for providing rotation of the back frame relative to the spear member; and
   (d) the back frame and the spear member are constructed to rotate about the rotation axis as a result of operation of the left and right hydraulic cylinders; and moving the bale to a new location.

9. The method according to claim 8, further comprising a step of disengaging the bale from the bale lift device.

10. A front end loader comprising:
   a pair of loader arms and a pair of hydraulic cylinders attached to the loader arms;
   a bale lift device attached to the pair of hydraulic cylinders and the pair of loader arms, wherein the bale lift device comprises:
   (a) a back frame having a first end, a second end, and at least one extension extending between the first end and the second end for separating the first end from the second end, the back frame being attached to the pair of loader arms and to the pair of hydraulic cylinders;
   (b) a spear member provided for engaging and holding a bale, the spear member having a first end and a second end, the first end being provided for penetrating the bale;
   (c) a rotation axis, wherein the back frame and the spear member are rotatably attached about the rotation axis for providing rotation of the back frame relative to the spear member; and (d) the back frame and the spear member are constructed to rotate about the rotation axis as a result of the operation of the pair of hydraulic cylinders.

11. The front end loader according to claim 7, further comprising a quick attachment device provided between the back frame and the pair of loader arms and the pair of hydraulic cylinders and being constructed for attaching the pair of loader arms and the pair of hydraulic cylinders to the back frame.

12. A bale lift device comprising:

(a) a back frame having a first end, a second end, and at least one extension extended between the first end and the second end for separating the first end from the second end, the back frame being constructed for attachment to a loader arm and to a hydraulic cylinder attached to the loader arm;

(b) a spear member provided for engaging and holding a bale, the spear member having a first end and a second end, the first end being provided for penetrating the bale;

(c) a push off attached to the back frame and constructed to slide along the spear member during operation of the hydraulic cylinder attached to a loader arm and to the back frame; and (d) a rotation axis, wherein the back frame and the spear member are rotatably attached about the rotation axis for providing rotation of the back frame relative to the spear member.

13. The bale lift device according to claim 9, wherein the push off comprises a bale engaging surface for pushing against a bale when the spear member is provided within the bale.

14. A bale lift device comprising:

(a) a back frame having a first end, a second end, and at least one extension extended between the first end and the second end for separating the first end from the second end, the back frame being constructed for attachment to a loader arm and to a hydraulic cylinder attached to the loader arm;

(b) a spear member provided for engaging and holding a bale, the spear member having a first end and a second end, the first end being provided for penetrating the bale;

(c) a push off attached to the back frame and constructed to slide along the spear member during operation of the hydraulic cylinder attached to a loader arm and to the back frame; and (d) a plurality of teeth rotatably attached to the second end of the back frame.

15. A bale lift device comprising:

(a) a back frame having a first end, a second end, and at least one extension extended between the first end and the second end for separating the first end from the second end, the back frame being constructed for attachment to a loader arm and to a hydraulic cylinder attached to the loader arm;

(b) a spear member provided for engaging and holding a bale, the spear member having a first end and a second end, the first end being provided for penetrating the bale, wherein the spear member comprises a spear; and (c) a push off attached to the back frame and constructed to slide along the spear member during operation of the hydraulic cylinder attached to a loader arm and to the back frame, wherein the push off is constructed to encircle the spear and slide along the spear.

* * * * *